Nov. 23, 1965    F. SCHREIBER    3,219,853
ELECTROMAGNETIC APPARATUS FOR MOVING A ROD STRUCTURE
WITHIN A TUBULAR HOUSING
Filed May 31, 1962    3 Sheets-Sheet 1

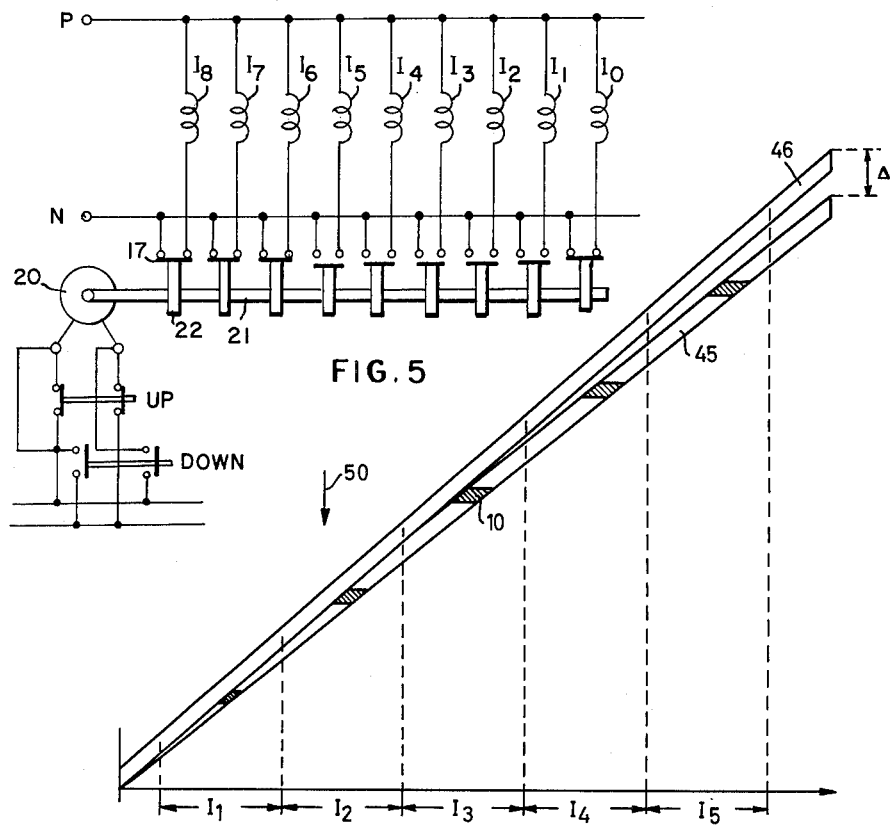
FIG. 5
FIG. 3
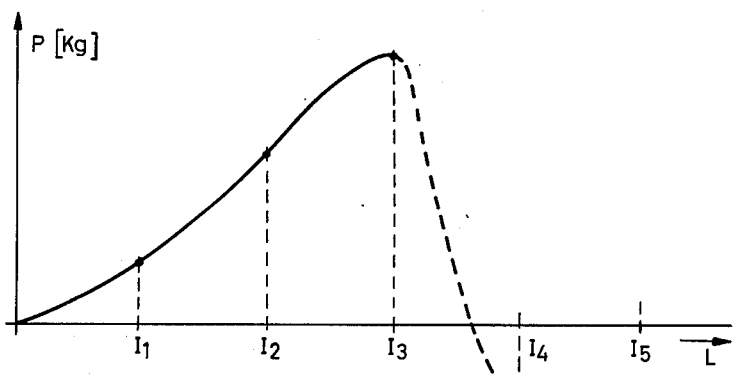
FIG. 4

United States Patent Office 3,219,853
Patented Nov. 23, 1965

3,219,853
ELECTROMAGNETIC APPARATUS FOR MOVING A ROD STRUCTURE WITHIN A TUBULAR HOUSING
Franz Schreiber, Erlangen, Germany, assignor to Siemens-Schuckertwerke Aktiengesellschaft, Berlin - Siemensstadt, Germany, a German corporation
Filed May 31, 1962, Ser. No. 199,004
Claims priority, application Germany, June 6, 1961, S 74,216
7 Claims. (Cl. 310—14)

My invention relates to electromagnetic apparatus for imparting a longitudinal displacing motion to a rod-shaped structure within a tubular housing by means of magnetic force acting from the outside through the housing wall. Such apparatus are applicable particularly in nuclear reactor plants for shifting the regulating and shut-off rods.

In a more particular aspect my invention relates to improvements of electromagnetic apparatus according to the co-pending application of F. Schreiber and H. Kumpf, Serial No. 127,374, filed July 27, 1961, now patent 3,162,796, and assigned to the assignee of the present invention. According to the principles disclosed in the co-pending application, the rod shaped structure within the tubular housing is provided with rack-like teeth in vernier relation to a number of magnet poles that are axially aligned on the outside of the housing. Such a system, for example, may comprise nine magnet poles along an axial distance occupied by ten teeth of the rod structure. By energizing and de-energizing the excitation windings in a progressing sequence the rod structure is lifted or lowered depending upon the direction of the sequence. Each two adjacent excitation coils are so wound or electrically interconnected that the resulting magnetic fluxes in the pole common to the two windings have the same direction and thus augment each other. The portions of the tubular housing located between the magnet poles become saturated by a minor portion of the magnetic flux, whereas the main portion of the magnetic flux passes through a closed flux path extending through a single pair of teeth on the rod strutcure.

It is an object of my invention to increase the efficiency and magnetic lifting force in such an apparatus for given over-all dimensions. A more specific object of the invention is to achieve the desired improvements by increasing the main magnetic flux passing through the tooth-divisional portion of the rod structure by minimizing the amount of magnetic flux that extends through the housing between the magnet poles and does not contribute to the lifting force.

To achieve these objects and in accordance with a feature of my invention, the axial width of the magnet poles that are axially and uniformly spaced from each other on the outside of the tubular housing in which the rod structure with its magnetizable teeth of a given vernier relation to the pole number is displaceable, is made equal to the sum of the axial width of one of the respective teeth plus twice the wall thickness of the tubular housing at its thinnest location between each two successive magnet poles.

As a result, the by far predominant portion of the magnetic flux finds a closed path through the tooth portion of the rod structure that consititutes a magnetizable armature for the poles from which the flux issues.

The tubular housing enclosing the rod structure may have equal thickness on the entire length along which the magnet poles are arranged, this thickness being smaller than the wall thickness at the upper and lower ends of the tubular housing.

According to another feature of my invention, the wall thickness of the tubular housing may be substantially uniform and the wall is provided with annular grooves between each two successive magnet poles. These grooves are located on the outer or inner surface of the tubular housing with the result of locally reducing the wall thickness of the housing and thereby also the magnetic shunt flux.

In lieu of annular grooves, ring members of non-magnetic materials such as austenitic steeel, may be welded into the tubular housing structure so that the magnetic shunt flux in the housing is completely suppressed. Such welded insert members, however, tend to cause fissures or cracks when the housing is subjected to large temperature variations as may occur, for example, when employing the electromagnetic apparatus as a drive for absorber rods in nuclear reactors.

The above mentioned and further objects, advantages and features of my invention, said features being set forth with particularity in the claims annexed hereto, will be apparent from the following description in conjunction with the embodiments of apparatus according to the invention illustrated by way of example on the accompanying drawings in which:

FIG. 3 illustrates schematically a planar development of the two screw threads according to FIG. 2.

FIG. 4 is a lifting-force diagram explanatory of apparatus according to the invention.

Figure 1:
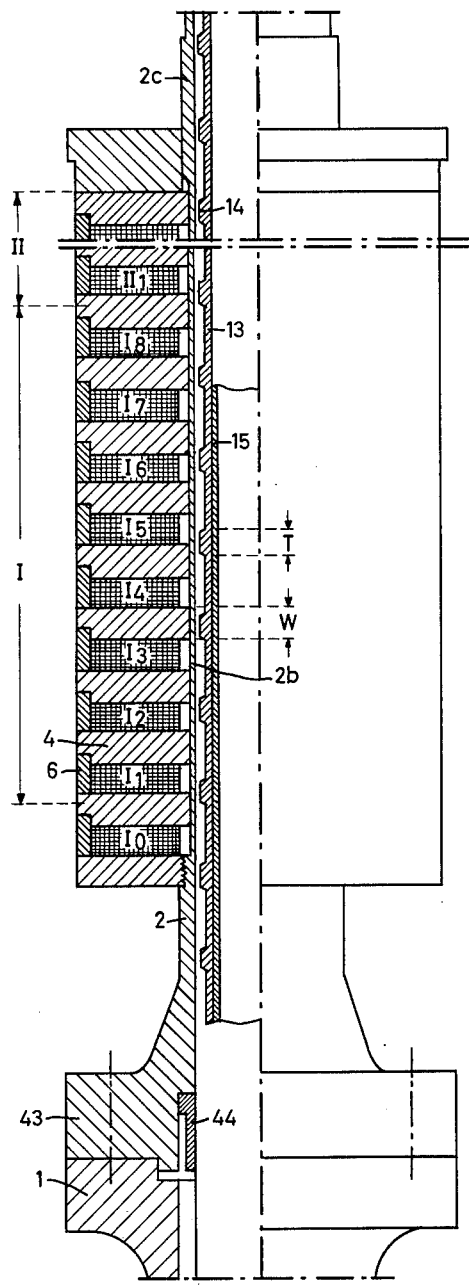
FIG. 1 shows a partial and partly sectional view of an apparatus in which the tubular housing for the displaceable rod structure has reduced wall thickness along the entire axial extent of the magnetic pole system.

According to FIG. 1, an enclosure 1, such as the tank of a nuclear reactor, carries a tubular housing 2 such as a pressure tube. The tubular housing consists of magnetizable material and is pressure-tightly joined with the enclosure 1. Concentrically mounted on the outside of housing 2 are a group of electromagnets comprising, for example, eight individual magnetizing coils $I_1$ to $I_8$, aside from an additional auxiliary coil $I_0$. The coils surround the tubular housing tube in coaxial relation thereto and are located between magnet poles in form of ring-shaped circular plates 4 firmly seated on the tubular housing tube. The electromagnets further comprise annular yoke rings 6 of magnetizable material which mechanically brace and magnetically interconnect the pole plates. Each two mutually adjacent coils are so wound or electrically connected that the resulting magnetic fluxes in the pole 4 common to the two coils have the same direction.

Located in the tubular housing tube is the rod structure 13 to be lifted or lowered. The rod structure consists of magnetizable material. It may form part of a regulating or absorber rod for the nuclear reactor. The cross section of the rod may be annular, for example. In this case, the inner surface of the rod structure may be coated with neutron absorbing substance 15, such as boron, indium or cadmium. The rod is provided with rack teeth consisting of peripheral rings 14 equally spaced from each other. The number of tooth rings 14 along the length I of the group of eight magnets differs from the number of magnet poles that occupy the same length. Thus, nine poles 4 are shown located opposite ten teeth 14. When the excitation coils are sequentially switched on and off in a progressing sequence, a substantially uniform pulling force in the upward or downward direction is imposed upon the teeth 14, and the rod 13 is moved in the same direction at substantially uniform speed. During such operation, the magnetic lines of force issuing from each two successive poles 4 find a closed flux path through a portion of the rod structure that covers one tooth division. However, some of the magnetic flux passes through the housing 2 which becomes saturated between each two excited and mutually adjacent magnet poles 4.

Figure 1A:
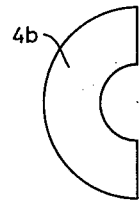
FIG. 1a is a plan view of one half portion of one of the pole discs that form part of the apparatus.

The width W of the magnet poles 4 is equal to the sum of the tooth width T on the rod 13 plus twice the wall thickness of the housing portions 2b located between the poles. The housing 2 has the same wall thickness along its entire length equipped with magnet poles and is thinner along this length than at the housing ends of which one is denoted by 2c. The magnet poles 4 are composed of radially subdivided ring-shaped plates, for example semicircular plates as shown at 4b in FIG. 1a.

Figure 1B:
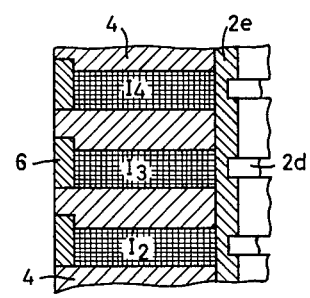
FIG. 1b shows a section a modified portion of apparatus otherwise corresponding to FIGS. 1 and 2.

The tubular housing tube may also be given the same wall thickness along its entire length and is then preferably provided with a ring-shaped groove on its inner or outer surface between each two successive magnet poles for thereby reducing the magnetic shunt flux between these poles. A portion of an apparatus thus modified is shown in FIG. 1b, the apparatus being identical with that in FIG. 1 in all other respects. The grooves between the magnet poles are denoted by 2d in FIG. 1b. The tubular housing 2e may be given the same wall thickness throughout, so that the thinnest localities between each two pole plates are determined by the remaining wall thickness at the bottom of the grooves. In this case, the width of the magnet poles is substantially equal to the sum of the tooth width on the rod plus twice the wall thickness of the housing 2e at the bottom of the ring-shaped grooves 2d.

For increasing the pulling force, additional groups of electromagnets, each comprising eight magnets, may be provided in addition to the group I according to FIG. 1. Thus, a second group II is indicated in FIG. 1 and one of its excitation coils is noted by $II_1$. The excitation coils of the individual groups are switched on and off in a uniform sequence, one coil in each group being switched simultaneously with a corresponding coil in the other group or groups. Preferably several consecutive excitation coils in each group, for example three, are simultaneously switched on, and when the next following coil is switched on, the first-excited coil in the subgroup is switched off, and so forth. For such sequential switching of the coils a suitable control device such as a cam-type switching device may be used, such as the device described in the copending application Serial No. 127,374 with reference to the circuit diagram shown in FIG. 20 and the sequence diagram shown in FIG. 22.

An auxiliary electromagnet with an excitation coil $I_0$ is added to the lowermost electromagnet of the group. The coil $I_0$ is switched on and off simultaneously with the uppermost excitation coil $I_8$ of the group. The additional electromagnet $I_0$ increases the pulling force of the lowermost magnet pole in accordance with the invention disclosed and claimed in the copending application of Günther Jahn, Serial No. 199,005, filed concurrently herewith and based upon the same German priority date of June 6, 1961. The additional electromagnet $I_0$ secures a reliable operation of the driving system when during lifting of the rod the excitation is switched from the uppermost excitation coil, for example $I_8$, to the excitation coil $I_1$. The number of the excitation coils preferably provided and hence the number of teeth on the rod structure, as well as the number of coil groups, are essentially dependent upon the weight of the structure to be displaced.

The tubular housing 2 is joined with the enclosure or tank by means of a flange 43. An elastic guide 44 of angular shape cross section is mounted in the flange 43 to prevent edging of the rod structure 13.

Figure 2:
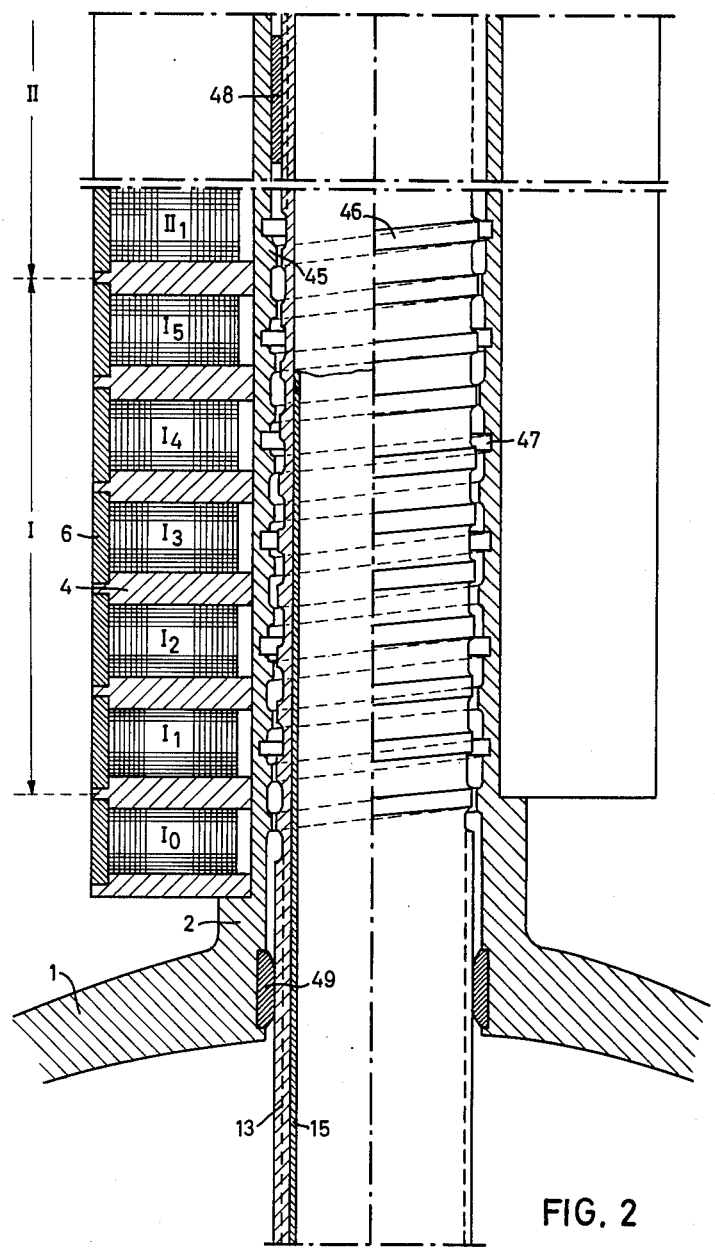
FIG. 2 is a partly sectional view of another apparatus in which the tubular housing is provided with internal helical grooves and the rack teeth of the rod structure form a helical screw thread.

The apparatus shown in FIG. 2 is provided with two coil groups I and II, each comprising five electromagnets whose excitation coils are denoted by $I_1$ to $I_5$ and $II_1$ to $II_5$. The apparatus is further equipped with an auxiliary magnet with an excitation coil $I_0$ which performs the same function as the correspondingly denoted auxiliary electromagnet in the apparatus of FIG. 1. The tubular housing 2 of magnetizable material according to FIG. 2 is provided with an internal thread 45. Each excitation coil is opposite two turns of the thread, for example. The rod-shaped structure 13 to be displaced is likewise provided with a screw thread 46 whose helical pitch differs from that of the thread 45 in the tubular housing. For example, the number of thread turns in the interior of the housing portion correlated to magnet poles of one group differs by one turn from the turn number of the thread on the rod section correlated to the same group of magnet poles. The tubular housing 2 is further provided with ring-shaped peripheral grooves 47 between each two magnet poles. These grooves correspond to those denoted by 2d in FIG. 1b and serve to reduce the wall thickness of the housing and thereby the magnetic shunt flux. The ring grooves also subdivide the helical threads which are likewise located on the inner surface of the tubular housing. In lieu thereof the peripheral grooves may be machined into the outer peripheral surface of the housing or may be substituted by welded-in rings of nonmagnetic material. Glide pieces 48 and 49 of annular cross-sectional shape are provided above and below the electromagnet system for guiding the rod structure.

The performance of the system will be understood from FIG. 3 in which the helical threads in the inner surface of the tubular housing and on the rod are represented by a planar development. However, for facilitating the explanation, it is assumed in FIG. 3 that the tubular housing contains non-magnetic welded insert rings 10. Plotted along the abscissa are the distances occupied by the excitation coils $I_1$ to $I_5$. It is further assumed that the coils $I_1$ and $I_2$ are switched on. When the coil $I_3$ is additionally switched on while simultaneously the coil $I_1$ is switched off, the rod structure is moved in the direction of the arrow 50 due to the difference in pitch of the two threads, this difference being equal, for example, to one turn along the coil group.

The diagram shown in FIG. 4 represents the curve of the lifting force P in kilograms exerted on the rod structure 13 in dependence upon the length L of the thread in the tubular housing. The area enclosed by the abscissa and by the curve corresponds to the total lifting force.

To those skilled in the art it will be obvious upon a study of this disclosure that apparatus according to my invention can be modified in various respects, particularly as to design features and the number of components, and can be employed for various purposes other than in conjunction with nuclear reactors, thus being realizable by embodiments other than those particularly illustrated and described herein, without departing from the essential features of my invention and within the scope of the claims annexed hereto.

I claim:

1. Electromagnetic apparatus for moving a rod structure within an enclosure by magnetic force applied from the outside, comprising a tubular housing and a rod structure longitudinally displaceable therein, a number of electromagnets aligned along said housing at the outside thereof and having uniformly spaced magnet poles of alternately different polarity, said rod structure having magnetizable teeth forming armatures for said respective magnets, the number of said teeth along a given length of said rod structure being different from the number of poles along the same length other than by an integral ratio in accordance with a given vernier ratio for displacement of said structure by sequential energization of said magnets, said respective magnet poles having an axial width equal to the sum of the corresponding width of one of said respective teeth plus twice the wall thickness of said housing at the thinnest location between each two successive ones of said magnet poles.

2. An apparatus according to claim 1, said tubular housing having uniform thickness along the length of the housing portion occupied by said magnet poles.

3. An apparatus according to claim 1, said magnet poles consisting of respective annular plates surrounding said tubular housing, each pole plate being radially subdivided.

4. Electromagnetic apparatus for moving a rod structure within an enclosure by magnetic force applied from the outside, comprising a tubular housing and a rod structure longitudinally displaceable therein, a number of electromagnets aligned along said housing at the outside thereof and having uniformly spaced pole plates of alternately different polarity, said rod structure having magnetizable teeth forming armatures for said respective magnets, the number of said teeth along a given length of said rod structure being different from the number of poles along the same length other than by an integral ratio in accordance with a given vernier ratio for displacement of said structure by sequential energization of said magnets, said tubular housing having a peripheral groove between each two successive ones of said pole plates and said respective pole plates having an axial width equal to the sum of the corresponding width of one of said respective teeth plus twice the wall thickness of said housing at the bottom of said grooves.

5. Electromagnetic apparatus for moving a rod structure with an enclosure by magnetic force applied from the outside, comprising a tubular housing and a rod structure longitudinally displaceable therein, a number of electromagnets aligned along said housing at the outside thereof and having uniformly spaced magnet poles of alternately different polarity, said rod structure having magnetizable teeth forming armatures for said respective magnets, the number of said teeth along a given length of said rod structure being different from the member of poles along the same length other than by an integral ratio in accordance with a given vernier ratio for displacement of said structure by sequential energization of said magnets, said teeth jointly constituting a screw thread on said rod structure, said tubular housing having on its inner side a helical groove extending between each two successive ones of said poles and having a pitch differing from that of said screw-thread, and said respective magnet poles having an axial width equal to the sum of the corresponding width of one of said respective teeth plus twice the wall thickness of said housing at the bottom of said grooves.

6. An apparatus according to claim 5, the number of turns of said helical groove in said housing differing by one from the number of turns of said teeth-forming screw thread on said rod structure along the total axial extent of said electromagnets.

7. An apparatus according to claim 5, said tubular housing having an annular peripheral groove between each two of said poles, said peripheral grooves subdividing said helical groove of said housing.

References Cited by the Examiner
UNITED STATES PATENTS

| | | | |
|---|---|---|---|
| 668,978 | 2/1901 | Carlson | 310—14 |
| 964,498 | 7/1910 | Dean | 310—12 |
| 1,909,470 | 5/1933 | Jacobson | 310—14 |
| 2,752,546 | 6/1956 | Frisch | 310—14 |
| 2,915,654 | 12/1959 | Robinson | 310—14 |

ORIS L. RADER, *Primary Examiner.*

MILTON O. HIRSHFIELD, *Examiner.*